(12) United States Patent
Seo et al.

(10) Patent No.: US 11,297,488 B2
(45) Date of Patent: Apr. 5, 2022

(54) ELECTRONIC DEVICE IN WHICH PROFILE IS INSTALLED AND OPERATING METHOD FOR ELECTRONIC DEVICE

(71) Applicant: Samsung Electronics Co., Ltd., Gyeonggi-do (KR)

(72) Inventors: Jaehyeon Seo, Gyeonggi-do (KR); Jeongdon Kang, Gyeonggi-do (KR); Sungoh Kim, Gyeonggi-do (KR); Sangsoo Lee, Gyeonggi-do (KR); Sanghwi Lee, Gyeonggi-do (KR); Jieun Jung, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 103 days.

(21) Appl. No.: 16/955,298

(22) PCT Filed: Jan. 31, 2019

(86) PCT No.: PCT/KR2019/001338
§ 371 (c)(1),
(2) Date: Jun. 18, 2020

(87) PCT Pub. No.: WO2019/151792
PCT Pub. Date: Aug. 8, 2019

(65) Prior Publication Data
US 2021/0006965 A1    Jan. 7, 2021

(30) Foreign Application Priority Data
Feb. 1, 2018    (KR) ........................ 10-2018-0012962

(51) Int. Cl.
*H04W 8/20*    (2009.01)
*H04W 12/041*    (2021.01)
(Continued)

(52) U.S. Cl.
CPC ............ *H04W 8/20* (2013.01); *G06F 3/0608* (2013.01); *G06F 3/0652* (2013.01);
(Continued)

(58) Field of Classification Search
CPC .... G06F 3/0608; G06F 3/0652; G06F 3/0673; H04L 63/067; H04L 63/0869;
(Continued)

(56) References Cited

U.S. PATENT DOCUMENTS

2016/0302061 A1    10/2016    Park et al.
2017/0077975 A1*    3/2017    Wang .................... H04W 8/183
(Continued)

FOREIGN PATENT DOCUMENTS

KR    10-1443161 B1    9/2014
KR    10-2016-0120598 A    10/2016
(Continued)

*Primary Examiner* — Asghar H Bilgrami
(74) *Attorney, Agent, or Firm* — Cha & Reiter, LLC.

(57) ABSTRACT

Provided according to various embodiments are an electronic device in which a profile is installed and an operating method for the electronic device. The electronic device may comprise: a communication module for receiving a profile package from a profile server; an eUICC for installing a profile by using the profile package, the eUICC including a memory; and a processor, wherein the processor is configured to: perform control such that the eUICC installs the profile thereon by using the profile package and a one-time key generated by mutual authentication between the profile server and the electronic device; when installation of the profile is unsuccessful, check the cause of the unsuccessful installation of the profile; when it is determined that the unsuccessful installation of the profile is due to insufficient available space in the memory, perform control such that the eUICC cleans the memory while keeping the one-time key stored in the memory; and perform control such that the (Continued)

eUICC reinstalls the profile thereon by using the profile package. Various other embodiments are also possible.

15 Claims, 11 Drawing Sheets

(51) Int. Cl.
- *H04W 12/06* (2021.01)
- *H04W 12/0431* (2021.01)
- *H04W 12/30* (2021.01)
- *H04W 12/37* (2021.01)
- *H04W 4/60* (2018.01)
- *H04W 12/069* (2021.01)
- *H04W 8/18* (2009.01)
- *G06F 3/06* (2006.01)
- *H04L 29/06* (2006.01)

(52) U.S. Cl.
CPC .......... *G06F 3/0673* (2013.01); *H04L 63/067* (2013.01); *H04L 63/0869* (2013.01); *H04W 12/041* (2021.01); *H04W 12/06* (2013.01)

(58) Field of Classification Search
CPC .. H04L 63/062; H04W 12/041; H04W 12/06; H04W 12/0431; H04W 12/35; H04W 12/37; H04W 8/205; H04W 4/60; H04W 12/069; H04W 8/20
See application file for complete search history.

(56) References Cited

U.S. PATENT DOCUMENTS

2017/0215063 A1* 7/2017 Wozniac ............... H04W 8/183
2019/0104401 A1 4/2019 Park et al.

FOREIGN PATENT DOCUMENTS

| KR | 10-2016-0132460 A | 11/2016 |
| KR | 10-2017-0109467 A | 9/2017 |

* cited by examiner

ELECTRONIC DEVICE IN WHICH PROFILE IS INSTALLED AND OPERATING METHOD FOR ELECTRONIC DEVICE

CROSS REFERENCE TO RELATED APPLICATIONS

This application is a National Phase Entry of PCT International Application No. PCT/KR2019/001338, which was filed on Jan. 31, 2019, and claims a priority to Korean Patent Application No. 10-2018-0012962, which was filed on Feb. 1, 2018, the contents of which are incorporated herein by reference.

TECHNICAL FIELD

The disclosure relates to an electronic device in which a profile used for communication by the electronic device is installed, and an operating method of the electronic device.

BACKGROUND ART

Various electronic devices, including smart phones, tablet personal computers (PCs), portable multimedia players (PMPs), personal digital assistants (PDAs), laptop PCs, wearable devices, and the like, have been propagated.

Various electronic devices may use a network provided by a communication company in order to perform wireless communication. Authentication between a server provided by a communication company and an electronic device is needed to use a network provided by the communication company, and the electronic device, together with the server provided by the communication company, may perform authentication by using a profile stored in the electronic device.

DISCLOSURE OF INVENTION

Technical Problem

In order to install a profile in an electronic device having an embedded universal integrated circuit card (eUICC) mounted thereon, the electronic device may perform authentication between the electronic device and a profile server provided by a communication company, and may then install the profile on the eUICC by using a profile package provided by the profile server.

In this regard, when a failure occurs in a process for installing the profile on the eUICC, the electronic device may delete the profile package and an encryption key generated based on an authentication result stored in a memory of the eUICC.

There may be various reasons why installation of a profile fails, and among the reasons, the installation of the profile may fail since the profile package is normal but an available space of the memory within the eUICC is insufficient.

When the eUICC 330 fails to install the profile therein, the electronic device should re-perform mutual authentication, should regenerate a one-time key, and should re-encrypt a profile package. This process may increase a time necessary to install a profile.

Solution to Problem

In accordance with an aspect of the disclosure, an electronic device may include: a communication module configured to receive a profile package from a profile server; an eUICC configured to install a profile by using the profile package and including a memory; and a processor, wherein the processor is configured to: control the eUICC to install the profile therein by using the profile package and a one-time key generated through mutual authentication between the profile server and the electronic device; when installation of the profile fails, identify a cause of failure of the installation of the profile; when it is identified that the failure of the installation of the profile is due to an insufficient available space in the memory, control the eUICC to clean the memory while maintaining a state in which the one-time key is stored in the memory; and control the eUICC to reinstall the profile therein by using the profile package.

In accordance with another aspect of the disclosure, an operating method of an electronic device may include: receiving a profile package from a profile server; installing a profile by using the profile package and a one-time key generated through mutual authentication between the profile server and the electronic device; when installation of the profile fails, identifying a cause of failure of the installation of the profile; when it is identified that the failure of the installation of the profile is due to an insufficient available space in a memory, cleaning the memory while maintaining a state in which the one-time key is stored in the memory; and reinstalling the profile by using the profile package.

Advantageous Effects of Invention

An electronic device, in which a profile is installed, and an operating method of the electronic device according to various embodiments of the disclosure: when installation of a profile fails due to an insufficient available space in a memory, clean the memory in a state of maintaining a generated encryption key; reinstall the profile by using the encryption key maintained during the installation of the profile; and thus do not re-perform mutual authentication between a profile server and the electronic device and download of a profile package, so as to enable a reduction in a time necessary to install a profile.

The electronic device, in which a profile is installed, and the operating method of the electronic device according to various embodiments of the disclosure: when installation of a profile fails due to an insufficient available space in a memory, clean the memory in a state of maintaining a downloaded profile package; reinstall the profile by using the profile package maintained during the installation of the profile; and thus do not re-perform mutual authentication between a profile server and the electronic device and download of a profile package, so as to enable a reduction in a time necessary to install a profile.

MODE FOR THE INVENTION

Figure 1:
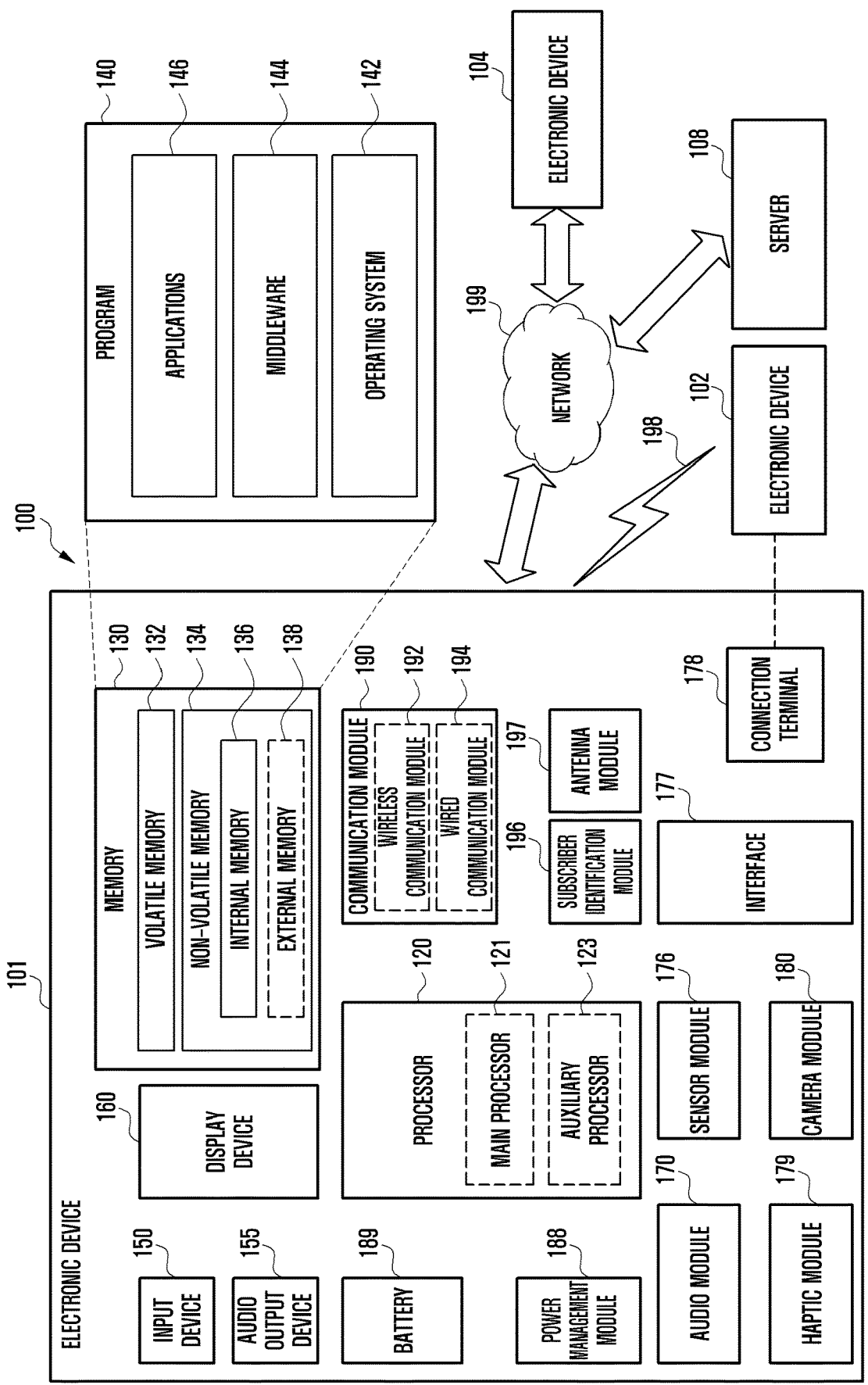
FIG. 1 is a block diagram of an electronic device according to various embodiments of the disclosure.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
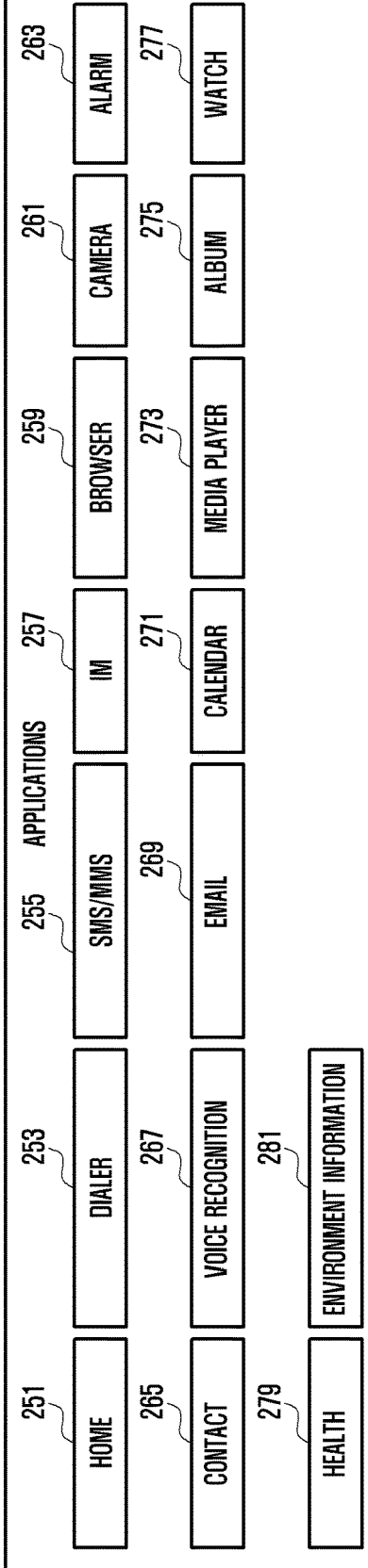
FIG. 2 is a block diagram of a program according to various embodiments of the disclosure.
Figure 2:
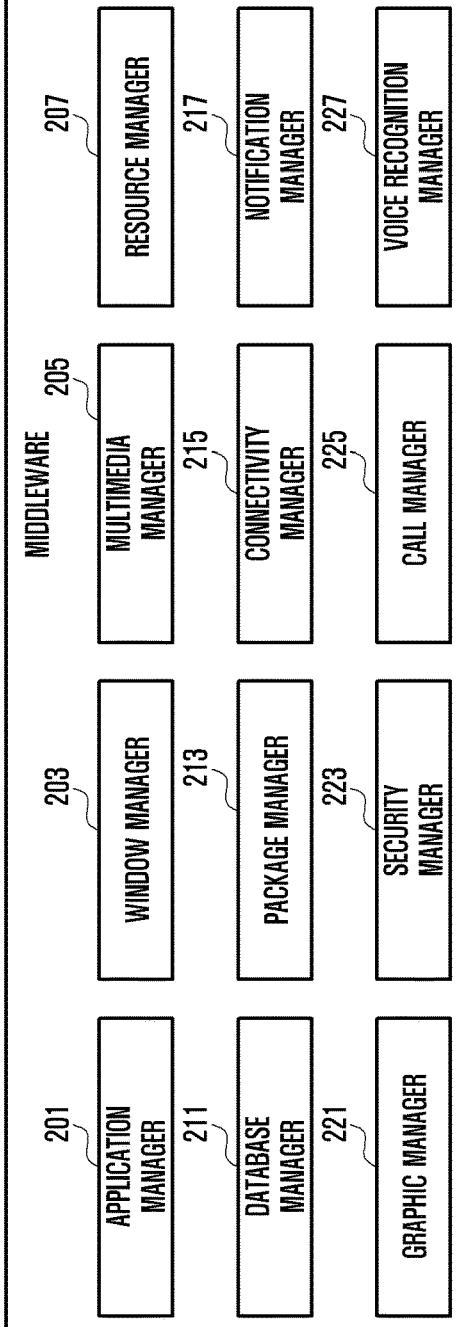

FIG. 2 is a block diagram 200 illustrating the program 140 according to various embodiments. According to an embodiment, the program 140 may include an operating system (OS) 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input device 150, the sound output device 155, the display device 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, message, or alert). The location manager 219, for example, may manage locational information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 244 may dynamically delete some existing components or add new components. According to an embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display device or a camera module of the external electronic device). The device management application, additionally or alternatively, may support installation, delete, or update of an application running on the external electronic device.

In various embodiments of the specification, a universal integrated circuit card (UICC) is a smart card which is used by being inserted into a mobile communication terminal, and may refer to a chip configured to: store personal information, such as network access authentication information, a telephone directory, and an SMS of a mobile communication subscriber; when the mobile communication terminal accesses a mobile communication network, including GSM, WCDMA, LTE, and the like, authenticate a subscriber and generate a traffic security key; and thus allow the mobile communication terminal to use safe mobile communication. A UICC may be equipped with a communication application, such as a subscriber identification module (SIM), a universal SIM (USIM), or an Internet protocol multimedia SIM (ISIM), according to the type of a mobile communication network accessed by the subscriber, and may also provide a higher-level security function for installation of various application programs, including an electronic wallet, ticketing, an electronic passport, and the like.

In various embodiments of the specification, an eUICC may refer to a security module that is not an attachable/detachable module, which can be inserted into, or removed from, a terminal but is embedded in the terminal and is of a chip type. The eUICC may download and install a profile by using an over-the-air (OTA) technology. The eUICC may be referred to as a "UICC capable of downloading and installing a profile".

In various embodiments of the specification, a method for downloading and installing a profile in an eUICC by using an OTA technology may also be applied to an attachable/detachable UICC which can be inserted into, or removed from, a terminal. Embodiments of the disclosure may be applied to a UICC capable of downloading and installing a profile by using the OTA technology.

In various embodiments of the specification, the term "UICC" may be used interchangeably with the term "subscriber identification module (SIM)", and the term "eUICC" may be used interchangeably with the term "an embedded SIM (eSIM)".

In various embodiments of the specification, a profile may refer to packaging of an application, a file system, an authentication key value, and the like, which are stored in a UICC, in the form of software.

In various embodiments of the specification, a USIM profile may have the same meaning as a profile, or may refer to packaging of information, included in a USIM application within a profile, in the form of software.

In various embodiments of the specification, a profile-providing server may be expressed as a subscription manager data preparation (SM-DP), a subscription manager data preparation plus (SM-DP+), an off-card entity of profile domain, a profile encryption server, a profile generation server, a profile provisioner (PP), a profile provider, a profile provisioning credentials holder (PPC holder), or a server.

In various embodiments of the specification, a profile information delivery server may be expressed as a discovery and push function (DPF) or a subscription manager discovery service (SM-DS).

In various embodiments of the specification, a profile management server may be expressed as a subscription manager secure routing (SM-SR), a subscription manager secure routing plus (SM-SR+), an off-card entity of eUICC profile manager or a profile management credentials holder (PMC holder), or an eUICC manager (EM).

In various embodiments of the specification, a profile server may be expressed as a server capable of performing operations performed by a profile-providing server, a profile management server, and a profile information delivery server.

In various embodiments of the specification, the term "terminal" used therein may be referred to as a "mobile station (MS)", a "user equipment (UE)", a "user terminal (UT)", a "wireless terminal", an "access terminal (AT)", a "subscriber unit", a "subscriber station (SS)", a "wireless device", a "wireless communication device", a "wireless transmit/receive unit (WTRU)", a "mobile node", a "mobile", or other terms. Various embodiments of a terminal may: include a cellular phone, a smart phone having a wireless communication function, a PDA having a wireless communication function, a wireless modem, a portable computer having a wireless communication function, a capturing device such as a digital camera having a wireless communication function, a gaming device having a wireless communication function, a household appliance which has a wireless communication function and stores and reproduces music, and an Internet household appliance capable of accessing and browsing the Internet; and further include portable units or terminals into which combinations of such functions are integrated. Further, the embodiments of the terminal may include a machine-to-machine (M2M) terminal and a machine-type communication (MTC) terminal/device, but the disclosure is not limited thereto. In the specification, the terminal may be referred to as an "electronic device".

In various embodiments of the specification, an electronic device may have an embedded UICC capable of downloading and installing a profile. When a UICC is not embedded in the electronic device, the UICC physically separated from the electronic device may be inserted into the electronic device and be connected thereto. For example, the UICC may be inserted into the electronic device in a card form. The electronic device may include the terminal, and in this example, the terminal may include a UICC capable of downloading and installing, therein, a profile. The UICC: may be embedded in the terminal; and when the terminal and the UICC are separated, may be inserted into the terminal, and may be inserted in the terminal so as to be connected thereto. The UICC capable of downloading and installing a profile may be referred to as, for example, an "eUICC".

In various embodiments of the specification, a profile discriminator may be referred to as a "profile identifier (profile ID)", an "integrated circuit card ID (ICCID)", or a "factor matching an issuer security domain profile (ISD-P) or a profile domain (PD)". The profile ID may represent a unique identifier of each profile.

In various embodiments of the specification, an eUICC identifier (eUICC ID) may be a unique identifier of an eUICC embedded in the terminal and may be referred to as an eUICC ID (EID). Also, when a provisioning profile is pre-installed in the eUICC, an eUICC identifier may be a profile ID of the corresponding provisioning profile. Further, when the terminal and the eUICC chip are not separated from each other as in an embodiment of the disclosure, an eUICC identifier may be a terminal ID. In addition, an eUICC identifier may indicate a particular secure domain of the eUICC chip.

In various embodiments of the specification, a profile container may be referred to as a "profile domain". The profile container may be a security domain.

In various embodiments of the specification, an application protocol data unit (APDU) may be a message for interworking of the terminal with the eUICC. Further, the APDU may be a message for interworking of a PP or a PM with the eUICC.

In various embodiments of the specification, profile provisioning credentials (PPC) may be a means which is used for mutual authentication and profile encryption between the PP and the eUICC and a signature. The PPC may include at least one of a symmetric key, a Rivest Shamir Adleman (RSA) certificate and personal key, an elliptic curved cryptography (ECC) certificate and personal key, and a root certification authority (root CA) and certificate chain. Further, when there are multiple PPs, for the multiple PPs, different PMCs may be stored in the eUICC or may be used.

In various embodiments of the specification, profile management credentials (PMC) may be a means which is used for mutual authentication and transmission data encryption between the PM and the eUICC and a signature. The PMC may include at least one of a symmetric key, an RSA certificate and personal key, an ECC certificate and personal key, and a root CA and certificate chain. Further, when there are multiple PMs, for the multiple PMs, different PMCs may be stored in the eUICC or may be used.

In various embodiments of the specification, an AID may be an application identifier. This value may be a discriminator which discriminates between different applications within the eUICC.

In various embodiments of the specification, a profile package tag, length, value (TLV) may be referred to as a "profile TLV". The profile package TLV may be a data set which represents information constituting a profile in a TLV format.

In various embodiments of the specification, an AKA may stand for an authentication and key agreement, and may refer to an authentication algorithm for accessing a third generation partnership project (3GPP) and 3GPP2 network.

In various embodiments of the specification, K may represent an encryption key value stored in the eUICC which is used for an AKA authentication algorithm.

In various embodiments of the specification, OPc may represent a parameter value which can be stored in the eUICC which is used for the AKA authentication algorithm.

In various embodiments of the specification, a NAA is a network access application program, and may be an application program such as a USIM or an ISIM which is stored in the UICC and is used to access a network. The NAA may be a network access module.

In describing the disclosure, when a detailed description of known functions or configurations related to the disclosure is determined to unnecessarily obscure the subject matter of the disclosure, the detailed description thereof will be omitted.

Hereinafter, an electronic device according to various embodiments of the disclosure will be described.

Figure 3:
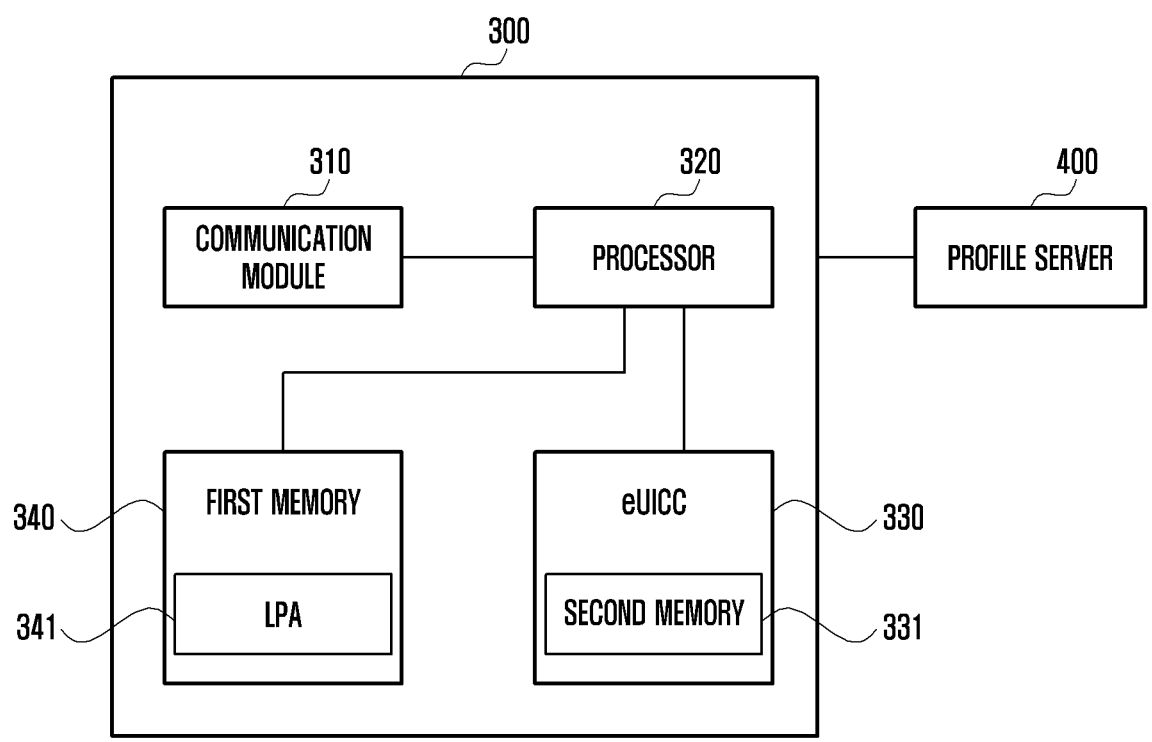
FIG. 3 is a block diagram of an electronic device according to various embodiments of the disclosure.

FIG. 3 is a diagram illustrating an electronic device and a profile server according to various embodiments of the disclosure.

The electronic device (e.g., the electronic device 100 of FIG. 1) 300 according to various embodiments of the disclosure may include a communication module (e.g., the communication module 190 of FIG. 1) 310, a processor (e.g., the processor 120 of FIG. 1) 320, an eUICC (e.g., the subscriber identification module 196 of FIG. 1) 330, and a first memory 340. The electronic device 100 may be partially or entirely similar to the electronic device 101 illustrated in FIG. 1. For example, the electronic device 300 may further include some elements among the various elements constituting the electronic device 101 illustrated in FIG. 1.

According to various embodiments of the disclosure, the electronic device 300 may have an embedded UICC capable of downloading and installing, therein, a profile. When a UICC is not embedded in the electronic device, the UICC physically separated from the electronic device may be inserted into the electronic device and connected thereto. For example, the UICC may be inserted into the electronic device in a card form. The electronic device may include the terminal, and in this example, the terminal may include a UICC capable of downloading and installing, therein, a profile. The UICC: may be embedded in the terminal; and when the terminal and the UICC are separated, may be inserted into the terminal, and may be inserted in the terminal so as to be connected thereto. The UICC capable of downloading and installing a profile may be referred to as, for example, an "eUICC".

According to various embodiments of the disclosure, a profile may refer to access information for accessing a communication company which manages communication used by the electronic device. The access information may include an international mobile subscriber identity (IMSI), which a type of a subscriber discriminator, and a K value or a Ki value, together with the subscriber discriminator, needed for authentication for use of a network provided by the communication company.

According to various embodiments of the disclosure, a profile package may refer to packaging of a profile and data related to the profile stored in the eUICC 330 of the electronic device 300. The profile package may refer to a data set obtained by packaging: various pieces of information and an encryption key needed for the electronic device 300 to use a wireless communication network provided by a particular communication company; and an application and the like which can be stored in the eUICC 330.

According to various embodiments of the disclosure, a profile server 400 may transmit a profile package to the electronic device 300 in response to a request of the electronic device 300.

According to various embodiments of the disclosure, the communication module 310 may receive a profile package from the profile server 400.

According to various embodiments of the disclosure, a profile package may be encrypted using a one-time encryption key, transmitted from the electronic device 300 to the profile server 400, and the encrypted profile package may be transmitted to the electronic device 300. The one-time encryption key used to encrypt the profile package may be generated by the eUICC 330 based on a result of mutual authentication by the processor 320, the eUICC 330, and the profile server 400 of the electronic device 300.

According to various embodiments of the disclosure, the profile server 400 may be referred to as an "SM-DP", an "SM-DP+", or the like.

According to various embodiments of the disclosure, the processor 320 may control the communication module 310 and the eUICC 330 based on a local profile assistant (LPA) 341 stored in a memory (e.g., the memory 130 illustrated in FIG. 1). The LPA 341 may refer to a management application configured to manage the eUICC 330.

According to various embodiments of the disclosure, the first memory 340 may store various types of data, including the LPA 341, the profile package received from and the profile server 400, and the like.

According to various embodiments of the disclosure, the processor 320 may perform mutual authentication between the processor 320 and the profile server 400. When the mutual authentication is successful, the processor 320 may deliver data related to an authentication result to the eUICC 330. The eUICC 330 may generate a one-time key based on the data related to the authentication result, and may deliver information related to the generated one-time key to the processor 320. The processor 320 may transmit the information related to the generated one-time key to the profile server 400, and may request the profile server 400 to transmit a profile package.

According to various embodiments of the disclosure, the processor 320 may receive a profile package transmitted by the profile server 400, and may deliver the profile package to the eUICC 330.

According to various embodiments of the disclosure, the eUICC 330 may refer to a chip-type security module embedded in the terminal. The eUICC 330 may install and store a profile needed for wireless communication by the electronic device 300.

According to various embodiments of the disclosure, an eUICC may download and install, therein, a profile by using an OTA technology. The eUICC may be referred to as a "UICC capable of downloading and installing a profile". In the specification, a method for downloading and installing a profile in an eUICC by using an OTA technology may also be applied to an attachable/detachable UICC which can be inserted into, or removed from, a terminal. Embodiments of the disclosure may be applied to a UICC capable of downloading and installing a profile by using the OTA technology.

According to various embodiments of the disclosure, the eUICC 330 may install the profile in a second memory 331 included within the eUICC 330 by using the profile package delivered by the processor 320. The eUICC 330 may install the profile by using data obtained by decrypting the encrypted profile package by using a one-time key stored in the second memory 331. According to various embodiments of the disclosure, the processor 320 may control the eUICC 330 to install the profile in the eUICC 330.

According to various embodiments of the disclosure, the eUICC 330 may fail to install the profile due to various reasons while installing the profile. For example, there may exist various reasons why the eUICC 330 fails to install the profile, including a cause in which an available space in the second memory 331 of the eUICC 330 is smaller than a space needed to install the profile, and the like.

According to various embodiments of the disclosure, when the eUICC 330 fails to install the profile, the eUICC 330 may transmit, to the LPA 341, a massage indicating the failure of installation of the profile. The LPA 341 may transmit, to the processor 320, the massage indicating the failure of installation of the profile. The processor 320 may transmit, to the profile server 400, the massage indicating the failure of installation of the profile.

According to a comparative example, when installation of a profile fails, after the eUICC 330 transmits a massage indicating the failure of installation of the profile, the eUICC 330 may delete the one-time key and the profile package, which is data needed to install the profile, from the second memory 331, and may terminate a profile installation session.

After the profile installation session is terminated, if a space needed to install a profile is secured in the second memory 331 of the eUICC 330, the processor 320 may re-perform mutual authentication between the electronic device 300 and the profile server 400, and the eUICC 330 may generate a one-time key based on a result of the mutual authentication. The profile server 400 may encrypt a profile package by using the generated one-time key. The processor 320 may re-receive the encrypted profile package from the profile server 400, and may reinstall a profile in the eUICC 330 by using the encrypted profile package. An operation of when installation of a profile fails, re-performing mutual authentication to profile encryption and an operation of re-downloading an encrypted profile package according to the comparative example may consume a lot of time.

In the electronic device according to various embodiments of the disclosure, the processor 320 may identify a reason for the failure of installation of the profile. For example, the processor 320 may identify an amount of the profile package from metadata of the profile package, and may compare the amount of the profile package with an available space in the second memory 331. If the amount of the profile package is larger than the available space in the second memory 331, the processor 320 may identify that the reason for the failure of installation of the profile is the insufficient available space in the second memory 331.

According to various embodiments of the disclosure, in response to a determination made by the processor 320 that the reason for the failure of installation of the profile is the insufficient available space in the second memory 331, the processor 320 may control the eUICC 330 to clean the second memory 331 in a state of maintaining the one-time key. After the second memory is cleaned, the processor 320 may control the eUCC 330 to reinstall the profile by using the profile package and the one-time key.

According to various embodiments of the disclosure, not the processor 320 but the eUICC 330 may identify the reason for the failure of installation of the profile.

According to various embodiments of the disclosure, the electronic device 300 may clean the second memory 331 in a state of maintaining the one-time key, and thus can reduce a time necessary to re-perform mutual authentication according to a comparison, regenerate a one-time key, and then re-encrypt a profile package.

Figure 8:
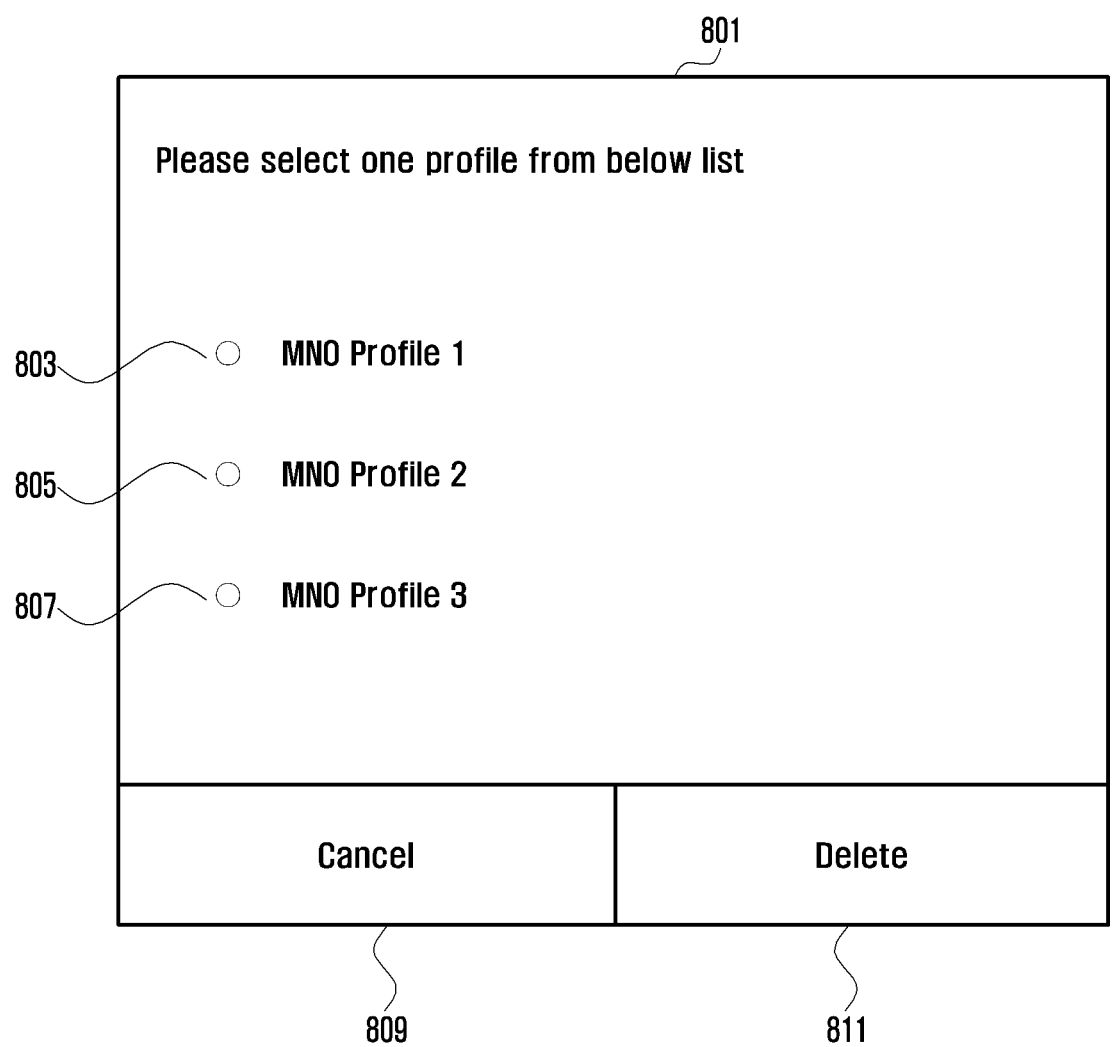

According to various embodiments of the disclosure, the processor 320 may display a screen for making a request for cleaning the memory of the eUICC 330, on a display (e.g., the display 1600 of FIG. 1). According to various embodiments of the disclosure, a screen for requesting memory cleaning may be implemented as illustrated in FIG. 8.

According to various embodiments of the disclosure, in response to reception of a user input for approving memory cleaning, the processor 320 may perform a task of cleaning the second memory 331, and may secure an available space in the second memory 331.

According to various embodiments of the disclosure, when a user input for requesting non-execution of memory cleaning is received, the processor 320 may not reinstall a profile. In this example, the processor 320 may control the eUICC 330 to delete the one-time key stored in the second memory 331.

According to various embodiments of the disclosure, the processor 320 may control the eUICC 330 to delete a pending notification list stored in the second memory 331. The pending notification list may include notifications to be transmitted to the profile server 400. The notifications to be transmitted to the profile server 400 may fail to be transmitted to the profile server 400 due to various causes, and may be stored in the second memory 331. According to various embodiments of the disclosure, the processor 320 may control the eUICC 330 to delete the pending notification list from the second memory 331, and thus may secure an available space in the second memory 331.

According to various embodiments of the disclosure, the processor 320 may secure an available space in the second memory 331, and may control the eUICC 330 to reinstall the profile therein. The eUICC 330 may reinstall the profile therein by using the one-time key stored in the second memory 331 and the profile package delivered by the processor 320.

According to various embodiments of the disclosure, a profile package transmitted by the profile server 400 may be stored in the second memory 331 while an available space in the second memory 331 is secured. According to another embodiment of the disclosure, a profile package transmitted by the profile server 400 may be temporarily stored in a separate memory (e.g., the memory 130 of FIG. 1) which is provided in the electronic device 300 and is not the second memory 331 within the eUICC 330, and may be retransmitted to the eUICC 330 at a request of the eUICC 330.

According to various embodiments of the disclosure, in order to secure an available space in the second memory 331, the eUICC 330 may delete a pending notification list stored in the second memory 331, and may then attempt to reinstall a profile.

According to various embodiments of the disclosure, in order to secure an available space in the second memory 331, the eUICC 330 may delete a pending notification list stored in the second memory 331, and may then reinstall a profile, but may fail to reinstall the profile. In this example, the processor 320 may delete an existing profile stored in the eUICC 330.

According to various embodiments of the disclosure, the processor 320 may control the display 160 to display a guide screen for deleting an existing profile stored in the eUICC 330. A guide screen for deleting a profile is illustrated in FIG. 9. Referring to FIG. 9, the processor 320 may output, on the display, a guide screen for deleting at least one of profiles installed in the eUICC 330.

According to various embodiments of the disclosure, in response to reception of a user input for deleting a profile, the processor 320 may delete a profile stored in the eUICC 330, and may secure an available space in the second memory 331. In response to securing of the available space in the second memory 331, the processor 320 may control the eUICC 330 to reinstall a profile.

According to various embodiments of the disclosure, when receiving a user input indicating non-deletion of a profile, the processor 320 may not reinstall a profile. In this example, the processor 320 may control the eUICC 330 to delete a one-time key stored in the second memory 331.

An electronic device according to various embodiments of the disclosure may include: a communication module configured to receive a profile package from a profile server; an eUICC configured to install a profile by using the profile package and including a memory; and a processor, wherein the processor is configured to: control the eUICC to install the profile therein by using the profile package and a one-time key generated through mutual authentication between the profile server and the electronic device; when installation of the profile fails, identify a cause of failure of the installation of the profile; when it is identified that the failure of the installation of the profile is due to an insufficient available space in the memory, control the eUICC to clean the memory while maintaining a state in which the one-time key is stored in the memory; and control the eUICC to reinstall the profile therein by using the profile package.

In the electronic device according to various embodiments of the disclosure, the processor may be configured to clean the memory while deleting a pending notification message (pending notification list) from the memory.

In the electronic device according to various embodiments of the disclosure, the processor may be configured to maintain the profile package when it is identified that an available space in the memory is insufficient.

In the electronic device according to various embodiments of the disclosure, the processor may be configured to clean the memory in a state of storing the profile package in the memory.

In the electronic device according to various embodiments of the disclosure, the eUICC may be configured to: request the processor to transmit the profile package in response to cleaning of the memory; and install the profile therein by using the profile package and the one-time key.

The electronic device according to various embodiments of the disclosure may further include a second memory configured to store a profile package received from the profile server, wherein the processor is configured to, when the eUICC transmits the profile package to the processor, transmit the profile package, stored in the second memory, to the eUICC.

In the electronic device according to various embodiments of the disclosure, the processor may be configured to: when reinstallation of the profile fails, identify a cause of failure of the reinstallation of the profile; when it is identified that the cause of the failure of the reinstallation of the profile is the insufficient available space in the memory, delete one of one or more profiles stored in the memory; and reinstall the profile by using the profile package.

In the electronic device according to various embodiments of the disclosure, the processor may be configured to: control a display to display a screen for making a request for cleaning the memory; and clean the memory according to a user input corresponding to the request for cleaning the memory.

In the electronic device according to various embodiments of the disclosure, the processor may be configured to delete the profile package and a one-time key generated through mutual authentication between the profile server and the electronic device, according to a user input corresponding to non-execution of cleaning of the memory.

In the electronic device according to various embodiments of the disclosure, the processor may be configured to: identify capacity of the profile package from metadata of the profile package; and identify the cause of the failure of the installation of the profile based on a result of a comparison between the available space in the memory and the capacity of the profile package.

Figure 4:
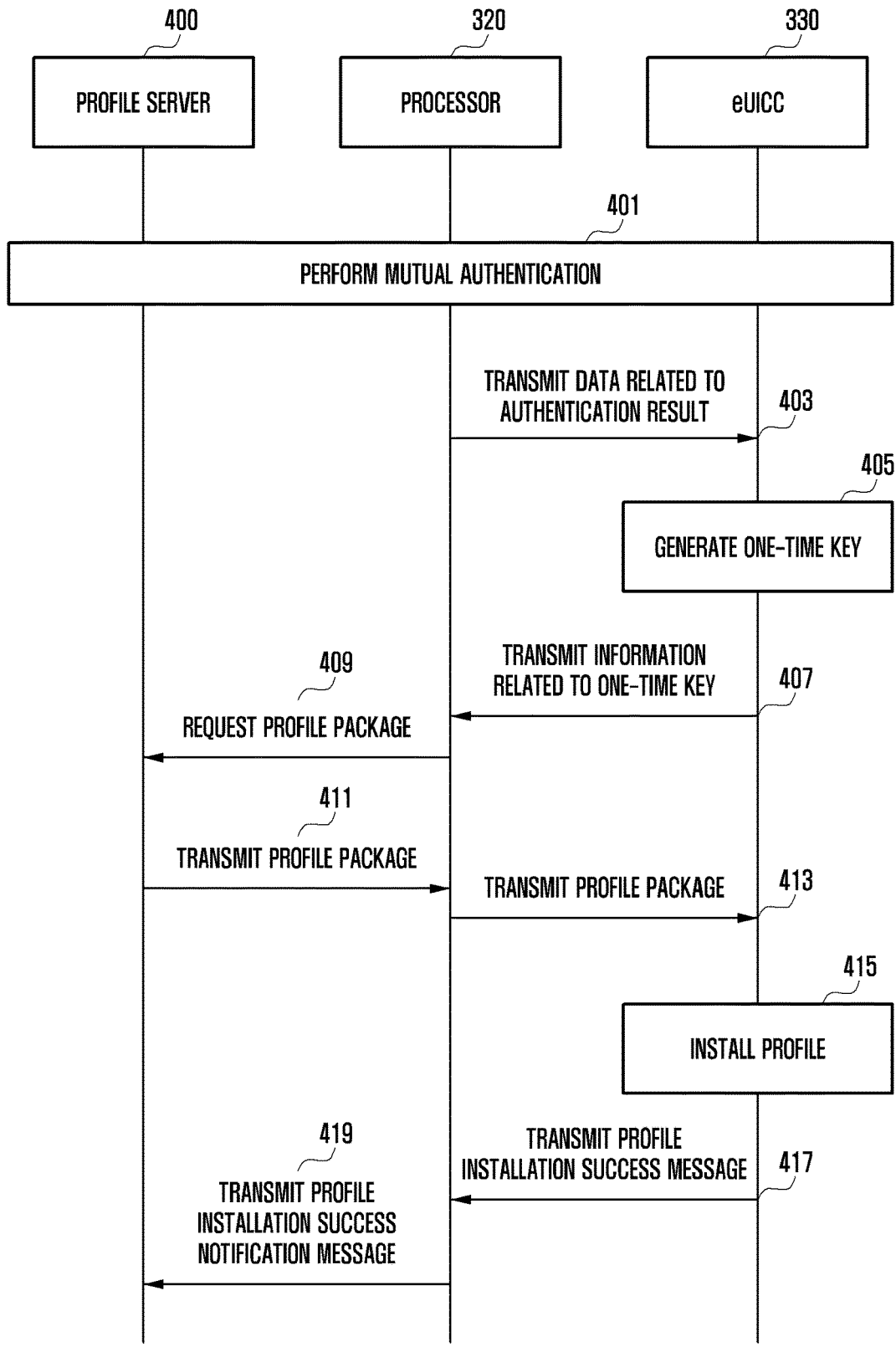
FIG. 4 is a diagram illustrating an embodiment for installing a profile in an eUICC of an electronic device according to various embodiments of the disclosure.

FIG. 4 is a diagram illustrating an embodiment for installing a profile in an eUICC of an electronic device according to various embodiments of the disclosure.

Referring to FIG. 4, in a method for installing a profile in an electronic device according to various embodiments of the disclosure, in operation 401, a profile server (e.g., the profile server 400 of FIG. 3), the processor 320, and the eUICC 330 may perform mutual authentication.

According to various embodiments of the disclosure, the profile server 400, the processor 320, and the eUICC 330 may perform mutual authentication by using an AKA which is an authentication algorithm for accessing a network defined in 3GPP and 3GPP2.

According to various embodiments of the disclosure, in operation 403, the processor 320 may transmit, to the eUICC 330, data related to a data authentication result generated through the mutual authentication among the profile server 400, the processor 320, and the eUICC 330.

According to various embodiments of the disclosure, in operation 405, the eUICC 330 may generate a one-time key based on the data related to the authentication result. According to various embodiments of the disclosure, a one-time key may be used to encrypt and decrypt a profile package. According to various embodiments of the disclosure, a one-time key may be generated using a public key cryptography, and may include a public key (otPK,eUICC.ECKA) and a secret key (otSK.EUICC.ECKA) which are defined in SGP.22 v. 2.0.

According to various embodiments of the disclosure, in operation 407, the eUICC 330 may transmit information related to the generated one-time key to the processor 320.

According to various embodiments of the disclosure, in operation 409, the processor 320 may request the profile server 400 to transmit a profile package. According to various embodiments of the disclosure, a profile may refer to access information for accessing a communication company which manages communication used by an electronic device. The profile package may refer to a data set obtained by packaging: various pieces of information and an encryption key needed for the electronic device 300 to use a wireless communication network provided by a particular communication company; and an application and the like which can be stored in the eUICC 330.

According to various embodiments of the disclosure, while requesting the profile server 400 to transmit a profile package, the processor 320 may transmit, to the profile server 400, information related to the one-time key generated by the eUICC 330.

In operation 411, the profile server 400 may transmit a profile package to the processor 320.

According to various embodiments of the disclosure, the profile server 400 may encrypt a profile package by using the public key (otPK,eUICC.ECKA) included in the information related to the one-time key, and may transmit the encrypted profile package to the processor 320.

In operation 413, the processor 320 may transmit, to the eUICC 330, the profile package received from the profile server 400.

In operation 415, the eUICC 330 may attempt to install a profile by using the profile package transmitted by the processor 320.

According to various embodiments of the disclosure, the eUICC 330 may decrypt the encrypted profile package by using the secret key (otSK,eUICC.ECKA) generated in operation 405, and may attempt to install a profile by using the decrypted profile package.

In operation 417, when installation of the profile is successful, the eUICC 330 may transmit, to the processor 320, a profile installation success notification message notifying of the success of installation of the profile. In operation 419, the processor 320 may transmit a profile installation success notification message to the profile server 740.

Figure 5A:
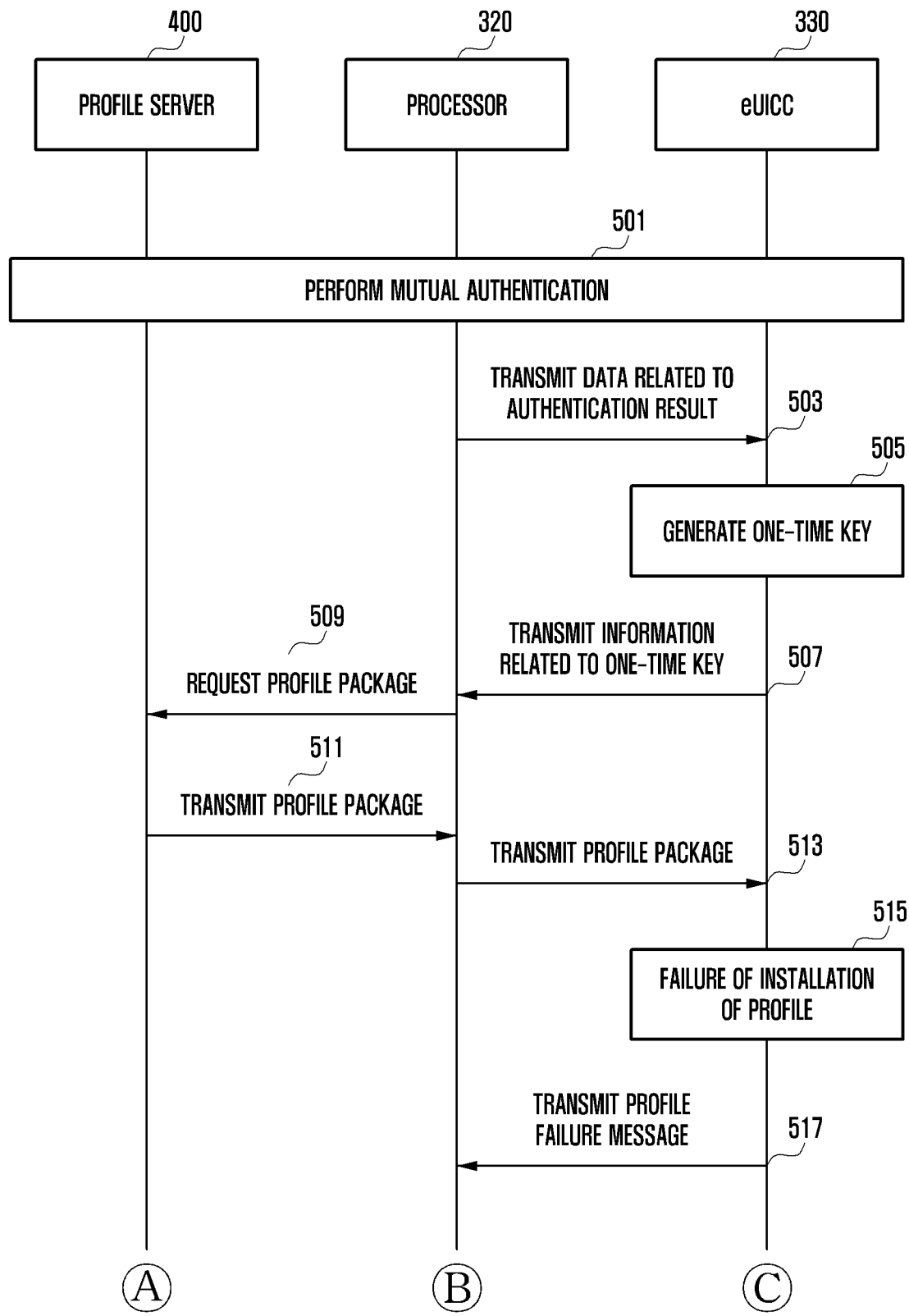
FIG. 5A and FIG. 5B are diagrams illustrating an embodiment for reinstalling a profile when installation of the profile in an eUICC of an electronic device fails according to various embodiments of the disclosure.
Figure 5B:
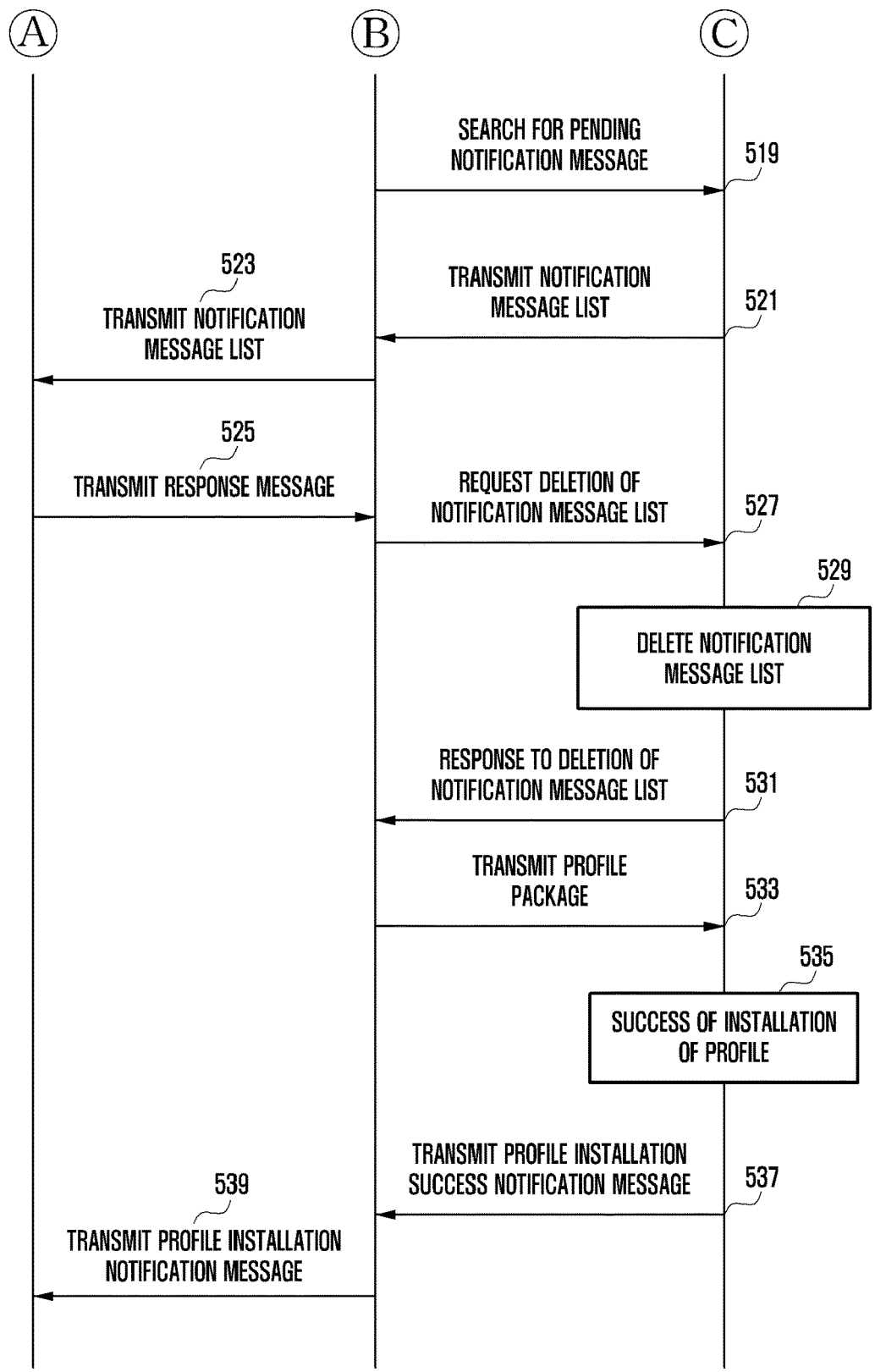

FIG. 5A and FIG. 5B are diagrams illustrating an embodiment for reinstalling a profile when installation of the profile in an eUICC of an electronic device fails according to various embodiments of the disclosure.

Referring to FIG. 5A and FIG. 5B, in a method for reinstalling a profile in an electronic device according to various embodiments of the disclosure, in operation 501, a profile server (e.g., the profile server 400 of FIG. 3), the processor 320, and the eUICC 330 may perform mutual authentication.

According to various embodiments of the disclosure, the profile server 400, the processor 320, and the eUICC 330 may perform mutual authentication by using an AKA which is an authentication algorithm for accessing a network defined in 3GPP and 3GPP2.

According to various embodiments of the disclosure, in operation 503, the processor 320 may transmit, to the eUICC 330, data related to an authentication result which is data generated through the mutual authentication among the profile server 400, the processor 320, and the eUICC 330.

According to various embodiments of the disclosure, in operation 505, the eUICC 330 may generate a one-time key based on the data related to the authentication result. According to various embodiments of the disclosure, a one-time key may be used to encrypt and decrypt a profile package. According to various embodiments of the disclosure, a one-time key may be generated using a public key cryptography, and may include a public key (otPK,eUIC-C.ECKA) and a secret key (otSK.EUICC.ECKA) which are defined in SGP.22 v. 2.0.

According to various embodiments of the disclosure, in operation 507, the eUICC 330 may transmit information related to the generated one-time key to the processor 320.

According to various embodiments of the disclosure, in operation 509, the processor 320 may request the profile server 400 to transmit a profile package. According to various embodiments of the disclosure, a profile may refer to access information for accessing a communication company which manages communication used by an electronic device. The profile package may refer to a data set obtained by packaging: various pieces of information and an encryption key needed for the electronic device 300 to use a wireless communication network provided by a particular communication company; and an application and the like which can be stored in the eUICC 330.

According to various embodiments of the disclosure, while requesting the profile server 400 to transmit a profile package, the processor 320 may transmit, to the profile server 400, information related to the one-time key generated by the eUICC 330.

According to various embodiments of the disclosure, in operation 511, the profile server 400 may transmit a profile package to the processor 320.

According to various embodiments of the disclosure, the profile server 400 may encrypt a profile package by using the public key (otPK,eUICC.ECKA) included in the information related to the one-time key, and may transmit the encrypted profile package to the processor 320.

According to various embodiments of the disclosure, in operation 513, the processor 320 may transmit, to the eUICC 330, the profile package received from the profile server 400.

According to various embodiments of the disclosure, in operation 515, the eUICC 330 may attempt to install a profile by using the profile package transmitted by the processor 320.

According to various embodiments of the disclosure, the eUICC 330 may decrypt the encrypted profile package by using the secret key (otSK,eUICC.ECKA) generated in operation 505, and may attempt to install a profile by using the decrypted profile package.

According to various embodiments of the disclosure, in operation 515, the eUICC 330 may identify that installation of the profile fails.

According to various embodiments of the disclosure, the eUICC 330 may identify a cause of failure of installation of the profile.

According to various embodiments of the disclosure, the eUICC 330 may identify capacity of the profile package from metadata of the profile package, and may compare the capacity of the profile package with an available space in a memory (e.g., the second memory 331 of FIG. 3). If the capacity of the profile package is larger than the available space of the second memory 331, the eUICC 330 may determine that the cause of the failure of installation of the profile is the insufficient available space in the second memory 331.

According to various embodiments of the disclosure, when the eUICC 330 determines that the cause of the failure of installation of the profile is the insufficient available space in the second memory 331, the processor 320 may control the eUICC 330 to clean the second memory 331 in a state of maintaining the one-time key. After the second memory 331 is cleaned, the processor 320 may control the eUICC 330 to reinstall the profile therein by using the profile package and the one-time key.

According to various embodiments of the disclosure, not the eUICC 330 but the processor 320 may identify the cause of the failure of installation of the profile.

In operation 517, the eUICC 330 may transmit, to the processor 320, a profile installation failure message notifying of the failure of installation of the profile.

According to various embodiments of the disclosure, the processor 320 may display a screen for making a request for cleaning the memory of the eUICC 330, on a display (e.g., the display 160 of FIG. 1). According to various embodiments of the disclosure, a screen for requesting memory cleaning may be implemented as illustrated in FIG. 8.

In response to reception of a user input for approving memory cleaning, the processor 320 may perform a task of cleaning the second memory 331, and thus may secure an available space in the second memory 331. An operation described below may refer to an operation in which the processor 320 deletes a pending notification message stored in the second memory 331 in order to secure an available space in the second memory 331.

According to various embodiments of the disclosure, in operation 517, the processor 320 may control the eUICC 330 to search for a pending notification message. The pending notification message may include notifications to be transmitted to the profile server 400. A notification message to be transmitted to the profile server 400 may fail to be transmitted to the profile server 400 due to various causes, and may be stored in the second memory 331.

According to various embodiments of the disclosure, in operation 519, the eUICC 330 may search for a pending notification message stored in the second memory 331.

According to various embodiments of the disclosure, in operation 521, the eUICC 330 may transmit a pending-notification message list to the processor 320. The pending-notification message list may include at least some of pending notification messages which fail to be transmitted to the profile server 400.

According to various embodiments of the disclosure, in operation 523, the processor 320 may transmit, to the profile server 400, a pending-notification message list received from the eUICC 330.

According to various embodiments of the disclosure, in operation 525, when receiving a pending-notification message list, the profile server 400 may transmit, to the processor 320, a response message indicating reception of the pending-notification message list.

According to various embodiments of the disclosure, in operation 527, the processor 320 may control the eUICC 330 to delete a pending notification message, in response to reception of the response message from the profile server 400. In operation 629, the eUICC 330 may delete the pending notification messages stored in the second memory 331.

According to various embodiments of the disclosure, the processor 320 may control the eUICC 330 to delete the pending notification message from the second memory 331, and thus may secure an available space in the second memory 331.

According to various embodiments of the disclosure, the processor 320 may secure an available space in the second memory 331, and may control the eUICC 330 to reinstall the profile therein.

According to various embodiments of the disclosure, in operation 529, the eUICC 330 may delete the notification message stored in the second memory 331.

According to various embodiments of the disclosure, while deleting the notification message stored in the second memory 331, the eUICC 330 may not delete but maintain the one-time key generated in operation 505.

According to various embodiments of the disclosure, while deleting the notification message stored in the second memory 331, the eUICC 330 may not delete but maintain the profile package received in operation 513.

According to various embodiments of the disclosure, in operation 531, when deletion of the pending notification message is completed, the eUICC 330 may transmit, to the processor 320, a message indicating the completion of deletion of the pending notification message.

According to various embodiments of the disclosure, in operation 533, the processor 320 may transmit, to the eUICC 330, a profile package stored in a first memory (e.g., the first memory 340 of FIG. 3).

According to various embodiments of the disclosure, when the eUICC 330 does not delete but maintains the profile package, received in operation 513, while deleting the notification message stored in the second memory 331, operation 533 may be omitted.

According to various embodiments of the disclosure, in operation 535, the eUICC 330 may attempt to reinstall the profile therein by using the one-time key stored in the second memory 331 and the profile package delivered by the processor 320.

According to various embodiments of the disclosure, in operation 537, when installation of the profile is successful, the eUICC 330 may transmit, to the processor 320, a profile installation success notification message notifying of the success of installation of the profile. In operation 539, the processor 320 may transmit a profile installation success notification message to the profile server 740.

Figure 6A:
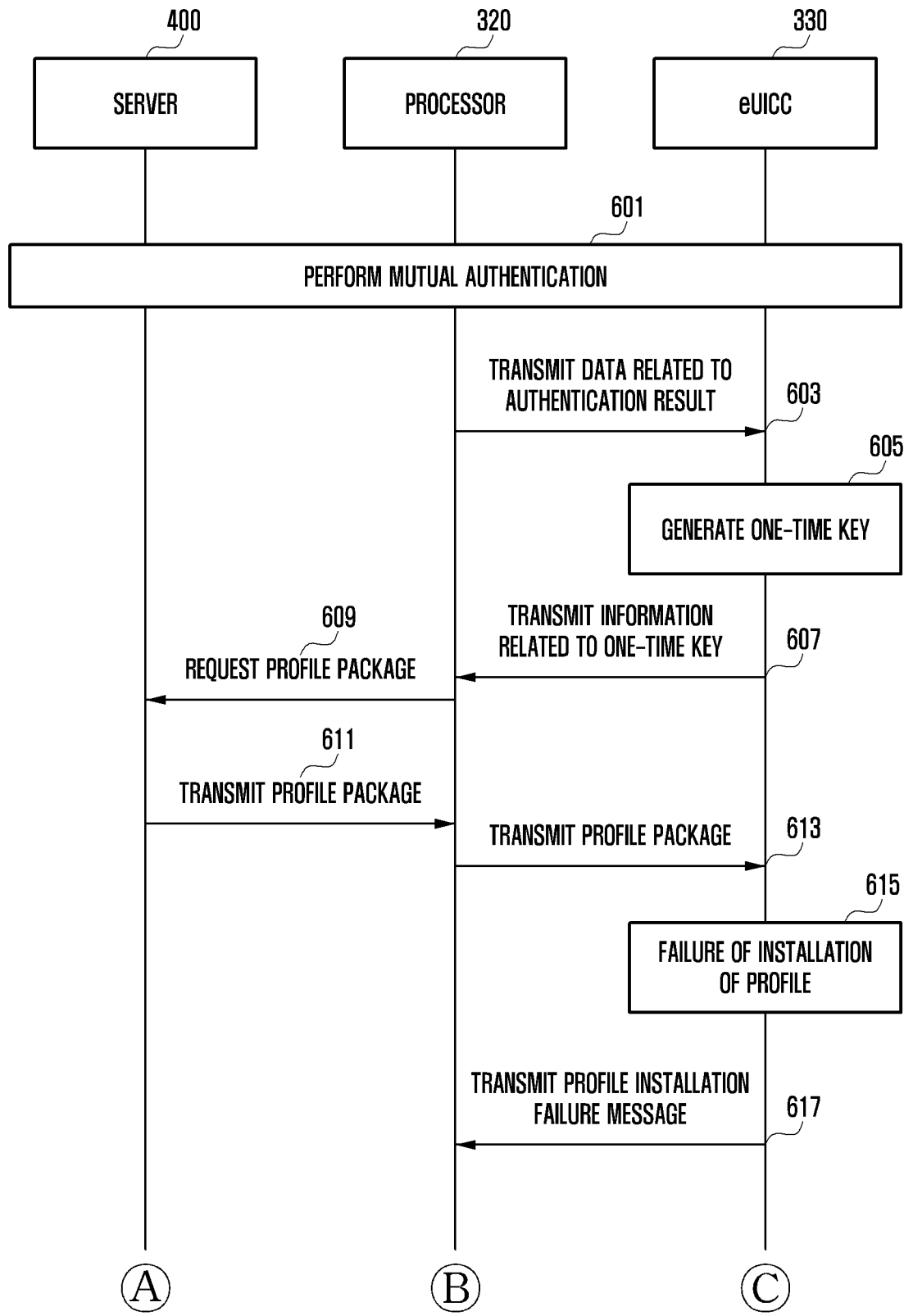
FIG. 6A, FIG. 6B, and FIG. 6C are diagrams illustrating another embodiment for reinstalling a profile when installation of the profile in an eUICC of an electronic device fails according to various embodiments of the disclosure.
Figure 6B:
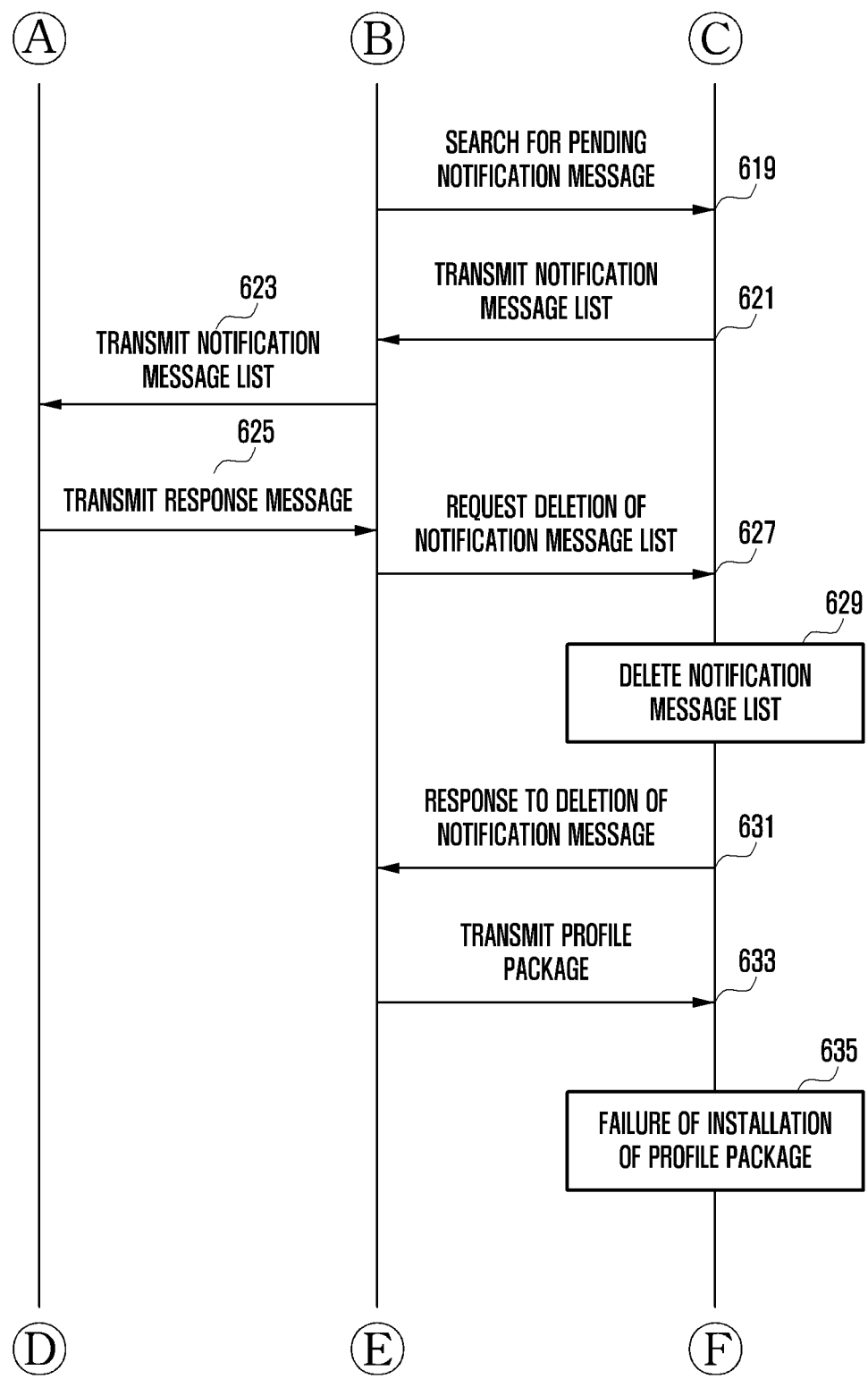
Figure 6C:
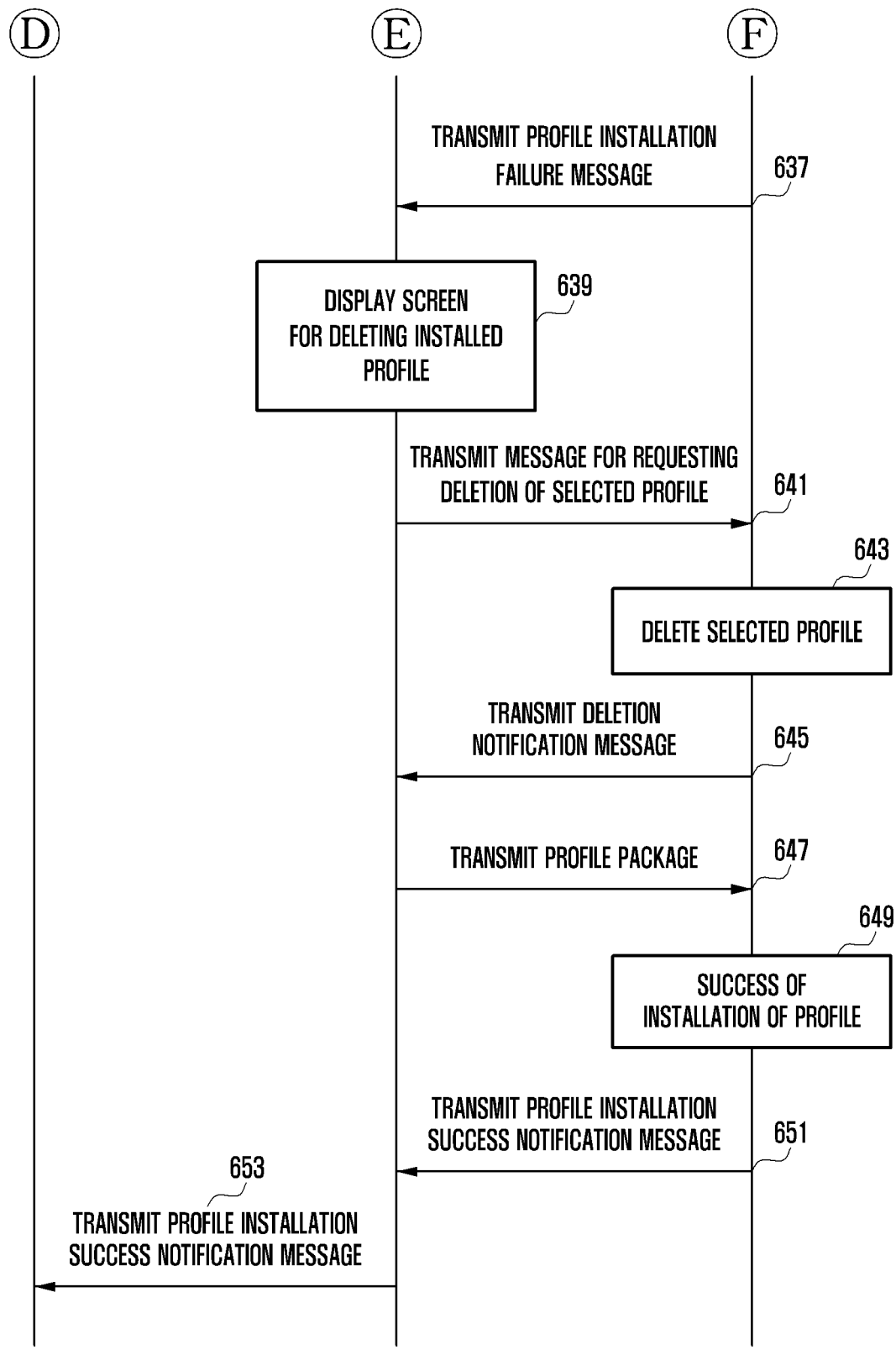

FIG. 6A, FIG. 6B, and FIG. 6C are diagrams illustrating another embodiment for reinstalling a profile when installation of the profile in an eUICC of an electronic device fails according to various embodiments of the disclosure.

Referring to FIG. 6A, FIG. 6B, and FIG. 6C, in a method for installing a profile in an electronic device according to various embodiments of the disclosure, in operation 601, a profile server (e.g., the profile server 400 of FIG. 3), the processor 320, and the eUICC 330 may perform mutual authentication.

According to various embodiments of the disclosure, the profile server 400, the processor 320, and the eUICC 330 may perform mutual authentication by using an AKA which is an authentication algorithm for accessing a network defined in 3GPP and 3GPP2.

According to various embodiments of the disclosure, in operation 703, the processor 320 may transmit, to the eUICC 330, data related to an authentication result which is data generated through the mutual authentication among the profile server 400, the processor 320, and the eUICC 330.

According to various embodiments of the disclosure, in operation 605, the eUICC 330 may generate a one-time key based on the data related to the authentication result. According to various embodiments of the disclosure, a one-time key may be used to encrypt and decrypt a profile package. According to various embodiments of the disclosure, a one-time key may be generated using a public key cryptography, and may include a public key (otPK,eUIC-C.ECKA) and a secret key (otSK.EUICC.ECKA) which are defined in SGP.22 v. 2.0.

According to various embodiments of the disclosure, in operation 607, the eUICC 330 may transmit information related to the generated one-time key to the processor 320.

According to various embodiments of the disclosure, in operation 609, the processor 320 may request the profile server 400 to transmit a profile package. According to various embodiments of the disclosure, a profile may refer to access information for accessing a communication company which manages communication used by an electronic device. The profile package may refer to a data set obtained by packaging: various pieces of information and an encryption key needed for the electronic device 300 to use a wireless communication network provided by a particular communication company; and an application and the like which can be stored in the eUICC 330.

According to various embodiments of the disclosure, while requesting the profile server 400 to transmit a profile package, the processor 320 may transmit, to the profile server 400, information related to the one-time key generated by the eUICC 330.

According to various embodiments of the disclosure, in operation 611, the profile server 400 may transmit a profile package to the processor 320.

According to various embodiments of the disclosure, the profile server 400 may encrypt a profile package by using the public key (otPK,eUICC.ECKA) included in the information related to the one-time key, and may transmit the encrypted profile package to the processor 320.

According to various embodiments of the disclosure, the processor 320 may transmit, to the eUICC 330, the profile package received from the profile server 400.

According to various embodiments of the disclosure, the eUICC 330 may attempt to install a profile by using the profile package transmitted by the processor 320.

According to various embodiments of the disclosure, the eUICC 330 may decrypt the encrypted profile package by using the secret key (otSK,eUICC.ECKA) generated in operation 705, and may attempt to install a profile by using the decrypted profile package.

According to various embodiments of the disclosure, in operation 615, the eUICC 330 may identify that installation of the profile fails.

According to various embodiments of the disclosure, the eUICC 330 may identify a cause of failure of installation of the profile.

According to various embodiments of the disclosure, the eUICC 330 may identify capacity of the profile package from metadata of the profile package, and may compare the capacity of the profile package with an available space in a memory (e.g., the second memory 331 of FIG. 3). If the capacity of the profile package is larger than the available space of the second memory 331, the eUICC 330 may determine that the cause of the failure of installation of the profile is the insufficient available space in the second memory 331.

In response to a determination made by the eUICC 330 that the cause of the failure of installation of the profile is the insufficient available space in the second memory 331, the processor 320 may control the eUICC 330 to clean the second memory 331 in a state of maintaining the one-time key. After the second memory 331 is cleaned, the processor 320 may control the eUICC 330 to reinstall the profile therein by using the profile package and the one-time key.

According to various embodiments of the disclosure, not the eUICC 330 but the processor 320 may identify the cause of the failure of installation of the profile.

According to various embodiments of the disclosure, in operation 617, the eUICC 330 may transmit, to the processor 320, a profile installation failure message notifying of the failure of installation of the profile.

According to various embodiments of the disclosure, the processor 320 may control the display 160 to display a screen for making a request for cleaning the memory of the eUICC 330. According to various embodiments of the disclosure, a screen for requesting memory cleaning may be implemented as illustrated in FIG. 8.

In response to reception of a user input for approving memory cleaning, the processor 320 may perform a task of cleaning the second memory 331, and thus may secure an available space in the second memory 331.

According to various embodiments of the disclosure, in operation 617, the processor 320 may control the eUICC 330 to search for a pending notification message. The pending notification message may include notifications to be transmitted to the profile server 400. Notification to be transmitted to the profile server 400 may fail to be transmitted to the profile server 400 due to various causes, and may be stored in the second memory 331.

According to various embodiments of the disclosure, in operation 619, the eUICC 330 may search for a pending notification message stored in the second memory 331, and in operation 621, the eUICC 330 may transmit a notification message list to the processor 320. The notification message list may include at least some of pending notification messages which fail to be transmitted to the profile server 400.

According to various embodiments of the disclosure, in operation 623, the processor 320 may transmit, to the profile server 400, a notification message list received from the eUICC 330.

According to various embodiments of the disclosure, in operation 625, the profile server 400 may transmit a response message to the processor 320 in response to reception of a notification message list.

According to various embodiments of the disclosure, in operation 627, the processor 320 may control the eUICC 330 to delete a pending notification message, in response to reception of the response message.

According to various embodiments of the disclosure, in operation 629, the eUICC 330 may delete the pending notification messages stored in the second memory 331.

According to various embodiments of the disclosure, the processor 320 may control the eUICC 330 to delete the pending notification message from the second memory 331, and thus may secure an available space in the second memory 331.

According to various embodiments of the disclosure, the processor 320 may secure an available space in the second memory 331, and may control the eUICC 330 to reinstall the profile therein.

According to various embodiments of the disclosure, in operation 629, the eUICC 330 may delete the pending notification message stored in the second memory 331.

According to various embodiments of the disclosure, while deleting the pending notification message stored in the second memory 331, the eUICC 330 may not delete but maintain the one-time key generated in operation 605.

According to another embodiment of the disclosure, while deleting the notification message stored in the second memory 331, the eUICC 330 may not delete but maintain the profile package received in operation 613.

According to various embodiments of the disclosure, in operation 631, when the pending notification message is deleted, the eUICC 330 may transmit, to the processor 320, a message indicating the deletion of the pending notification message.

According to various embodiments of the disclosure, in operation 633, the processor 320 may transmit, to the eUICC 330, a profile package stored in a separate memory.

According to another embodiment of the disclosure, when the eUICC 330 does not delete but maintains the profile package, received in operation 613, while deleting the notification message stored in the second memory 331, operation 633 may be omitted.

According to various embodiments of the disclosure, in operation 635, the eUICC 330 may attempt to reinstall the profile therein by using the one-time key stored in the second memory 331 and the profile package delivered by the processor 320.

According to various embodiments of the disclosure, in order to secure an available space in the second memory 331, the eUICC 330 may delete a pending notification message stored in the second memory 331, and may then reinstall a profile, but may fail to reinstall the profile. In this example, the processor 320 may delete an existing profile stored in the eUICC 330.

To this end, in operation 637, the eUICC 330 may transmit, to the processor 320, a profile installation failure message notifying of the failure of installation of the profile. In operation 639, the processor 320 may display a screen for deleting the installed existing profile.

According to various embodiments of the disclosure, a screen for deleting an installed profile may be implemented as illustrated in FIG. 9. Referring to FIG. 9, the processor 320 may output, on the display, a guide screen for deleting at least one of profiles installed in the eUICC 330.

According to various embodiments of the disclosure, in operation 641, in response to a user input through which a user selects a profile in order to delete at least one of the profiles, the processor 320 may transmit, to the eUICC 330, a deletion request message for requesting deletion of the selected profile.

According to various embodiments of the disclosure, in operation 643, the eUICC 330 may delete the selected profile, and in operation 645, may transmit, to the processor 320, a deletion notification message notifying of the deletion of the selected profile.

According to various embodiments of the disclosure, in operation 647, the processor 320 may transmit, to the eUICC 330, the profile package stored in the separate memory.

According to various embodiments of the disclosure, when the eUICC 330 does not delete but maintains the profile package received in operation 613 while deleting a notification message stored in the second memory 331, operation 647 may be omitted.

According to various embodiments of the disclosure, in operation 649, the eUICC 330 may attempt to reinstall the profile by using the one-time key stored in the second memory 331 and the profile package delivered by the processor 320.

According to various embodiments of the disclosure, in operation 651, when installation of the profile is successful, the eUICC 330 may transmit, to the processor 320, a profile installation success notification message notifying of the success of installation of the profile. In operation 653, the processor 320 may transmit a profile installation success notification message to the profile server 740.

An operating method of an electronic device according to various embodiments of the disclosure may include: receiving a profile package from a profile server; installing a profile by using the profile package and a one-time key generated through mutual authentication between the profile server and the electronic device; when installation of the profile fails, identifying a cause of failure of the installation of the profile; when it is identified that the failure of the installation of the profile is due to an insufficient available space in a memory, cleaning the memory while maintaining a state in which the one-time key is stored in the memory; and reinstalling the profile by using the profile package.

In the operating method of the electronic device according to various embodiments of the disclosure, the cleaning of the memory may include deleting a pending notification message (pending notification list) from the memory.

In the operating method of the electronic device according to various embodiments of the disclosure, the cleaning of the memory may include maintaining the profile package when it is identified that an available space in the memory is insufficient.

In the operating method of the electronic device according to various embodiments of the disclosure, the cleaning of the memory may include cleaning the memory in a state of storing the profile package in the memory.

The operating method of the electronic device according to various embodiments of the disclosure may include: when cleaning of the memory is completed, requesting the processor to transmit the profile package; and installing the profile by using the profile package and the one-time key.

In the operating method of the electronic device according to various embodiments of the disclosure, the reinstalling of the profile may include, in response to requesting, by the eUICC, the processor to transmit the profile package, transmitting the profile package, stored in the second memory in which the profile package received from the profile server is stored, to the eUICC.

The operating method of the electronic device according to various embodiments of the disclosure may include: when reinstallation of the profile fails, identifying a cause of failure of the reinstallation of the profile; when it is identified that the cause of the failure of the reinstallation of the profile is the insufficient available space in the memory, deleting one of one or more profiles stored in the memory; and reinstalling the profile by using the profile package.

In the operating method of the electronic device according to various embodiments of the disclosure, the cleaning of the memory may include: displaying a screen for making a request for cleaning the memory; and cleaning the memory in response to a user input corresponding to the request for cleaning the memory.

In the operating method of the electronic device according to various embodiments of the disclosure, the cleaning of the memory may include deleting the profile package and a one-time key generated through mutual authentication between the profile server and the electronic device, in response to a user input corresponding to non-execution of cleaning of the memory.

In the operating method of the electronic device according to various embodiments of the disclosure, the identifying of the cause of the failure of the installation of the profile may include: identifying capacity of the profile package from metadata of the profile package; and identifying the cause of the failure of the installation of the profile based on a result of a comparison between the available space in the memory and the capacity of the profile package.

Figure 7:
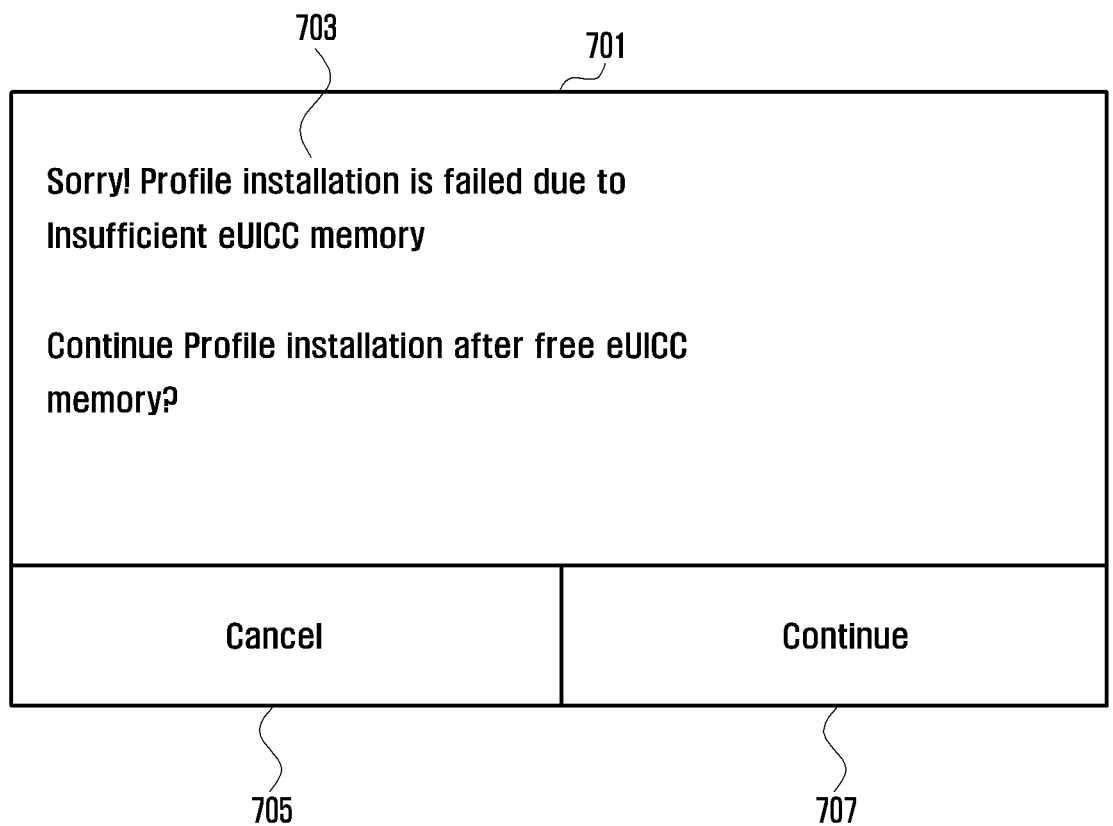
FIG. 7 and FIG. 8 are views each illustrating an embodiment of a screen which is output on a display when installation of a profile fails in an electronic device according to various embodiments of the disclosure.

FIG. 7 is a view illustrating a screen displayed on a display (e.g., the display 160 of FIG. 1) by an electronic device (e.g., the electronic device 300 of FIG. 3) according to various embodiments of the disclosure.

Referring to FIG. 7, a processor (e.g., the processor 320 of FIG. 3) of the electronic device 300 according to various embodiments of the disclosure may display, on the display 160, a screen 701 for making a request for cleaning a second memory (e.g., the second memory 331 of FIG. 3) of an eUICC (e.g., the eUICC 330 of FIG. 3).

According to various embodiments of the disclosure, when installation of a profile in the eUICC 330 fails due to an insufficient available space of the second memory 331, the processor 320 may display the screen illustrated in FIG. 7.

According to various embodiments of the disclosure, the screen 701 for making a request for cleaning the second memory 331 may include contents notifying of failure of installation of a profile, and contents 703 notifying a user of selection of whether to clean the second memory 331.

According to various embodiments of the disclosure, when receiving a user input through which the user selects an area 707 for approval of cleaning of the second memory 331, the processor 320 may clean the second memory 331. For example, the processor 320 may control the eUICC 330 to delete a pending notification message list stored in the second memory 331.

According to various embodiments of the disclosure, when receiving a user input through which the user selects an area 707 for rejection of cleaning of the second memory 331, the processor 320 may control the eUICC 330 to terminate the installation of the profile. In this example, the eUICC 330 may delete a profile package and the like stored in the second memory 331, and may terminate the installation of the profile.

FIG. 8 is a view illustrating a screen displayed on a display (e.g., the display 160 of FIG. 1) by an electronic device (e.g., the electronic device 300 of FIG. 3) according to various embodiments of the disclosure.

A processor (e.g., the processor 320 of FIG. 3) of the electronic device 300 according to various embodiments of the disclosure may display, on the display 160, a screen 801 for selection of a profile to be deleted among one or more profiles installed in an eUICC (e.g., the eUICC 330 of FIG. 3).

Referring to FIG. 8, the screen 801 for selection of a profile to be deleted may include a list of one or more profiles 803, 805, and 807 installed in the eUICC 330.

According to various embodiments of the disclosure, the processor 320 may receive a user input for selection of a profile to be deleted among the one or more profiles 803, 805, and 807 installed in the eUICC 330, and a user input for selection of an area 811 for approving deletion of a profile, and may then control the eUICC 330 to delete the selected profile.

According to various embodiments of the disclosure, when receiving a user input for selection of an area 809 for rejecting deletion of at least one profile among the one or more profiles 803, 805, and 807 installed in the eUICC 330, the processor 320 may control the eUICC 330 to terminate installation of a profile. In this example, the eUICC 330 may delete a profile package and the like stored in the second memory 331, and may terminate the installation of the profile.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
 a communication module configured to receive a profile package from a profile server;

an eUICC configured to install a profile by using the profile package and comprising a memory; and a processor, wherein the processor is configured to:

control the eUICC to install the profile therein by using the profile package and a one-time key generated through mutual authentication between the profile server and the electronic device;

when installation of the profile fails, identify a cause of failure of the installation of the profile;

when it is identified that the failure of the installation of the profile is due to an insufficient available space in the memory, control the eUICC to clean the memory while maintaining a state in which the one-time key is stored in the memory; and control the eUICC to reinstall the profile therein by using the profile package.

2. The electronic device as claimed in claim 1, wherein the processor is configured to clean the memory while deleting a pending notification message (pending notification list) from the memory.

3. The electronic device as claimed in claim 1, wherein the processor is configured to maintain the profile package when it is identified that an available space in the memory is insufficient.

4. The electronic device as claimed in claim 3, wherein the processor is configured to clean the memory in a state of storing the profile package in the memory.

5. The electronic device as claimed in claim 1, wherein the eUICC is configured to:

request the processor to transmit the profile package in response to cleaning of the memory; and install the profile therein by using the profile package and the one-time key.

6. The electronic device as claimed in claim 5, further comprising a second memory configured to store a profile package received from the profile server, wherein the processor is configured to, when the eUICC transmits the profile package to the processor, transmit the profile package, stored in the second memory, to the eUICC.

7. The electronic device as claimed in claim 1, wherein the processor is configured to:

when reinstallation of the profile fails, identify a cause of failure of the reinstallation of the profile;

when it is identified that the cause of the failure of the reinstallation of the profile is the insufficient available space in the memory, delete one of one or more profiles stored in the memory; and reinstall the profile by using the profile package.

8. The electronic device as claimed in claim 1, wherein the processor is configured to:

control a display to display a screen for making a request for cleaning the memory; and clean the memory according to a user input corresponding to the request for cleaning the memory.

9. The electronic device as claimed in claim 1, wherein the processor is configured to delete the profile package and a one-time key generated through mutual authentication between the profile server and the electronic device, according to a user input corresponding to non-execution of cleaning of the memory.

10. The electronic device as claimed in claim 1, wherein the processor is configured to:

identify capacity of the profile package from metadata of the profile package; and identify the cause of the failure of the installation of the profile based on a result of a comparison between the available space in the memory and the capacity of the profile package.

11. An operating method of an electronic device, the operating method comprising:

receiving a profile package from a profile server;

installing a profile by using the profile package and a one-time key generated through mutual authentication between the profile server and the electronic device;

when installation of the profile fails, identifying a cause of failure of the installation of the profile;

when it is identified that the failure of the installation of the profile is due to an insufficient available space in a memory, cleaning the memory while maintaining a state in which the one-time key is stored in the memory; and reinstalling the profile by using the profile package.

12. The operating method as claimed in claim 11, wherein the cleaning of the memory comprises deleting a pending notification message (pending notification list) from the memory.

13. The operating method as claimed in claim 11, wherein the cleaning of the memory comprises maintaining the profile package when it is identified that an available space in the memory is insufficient.

14. The operating method as claimed in claim 13, wherein the cleaning of the memory comprises cleaning the memory in a state of storing the profile package in the memory.

15. The operating method as claimed in claim 11, comprising:

when cleaning of the memory is completed, requesting the processor to transmit the profile package; and installing the profile by using the profile package and the one-time key.

* * * * *